May 3, 1966 R. BEGHI 3,248,972
METHOD OF MAKING A COLD DRAWING DIE
Filed June 10, 1965 2 Sheets-Sheet 1

INVENTOR
RENE' BEGHI
BY AMSTER & ROTHSTEIN

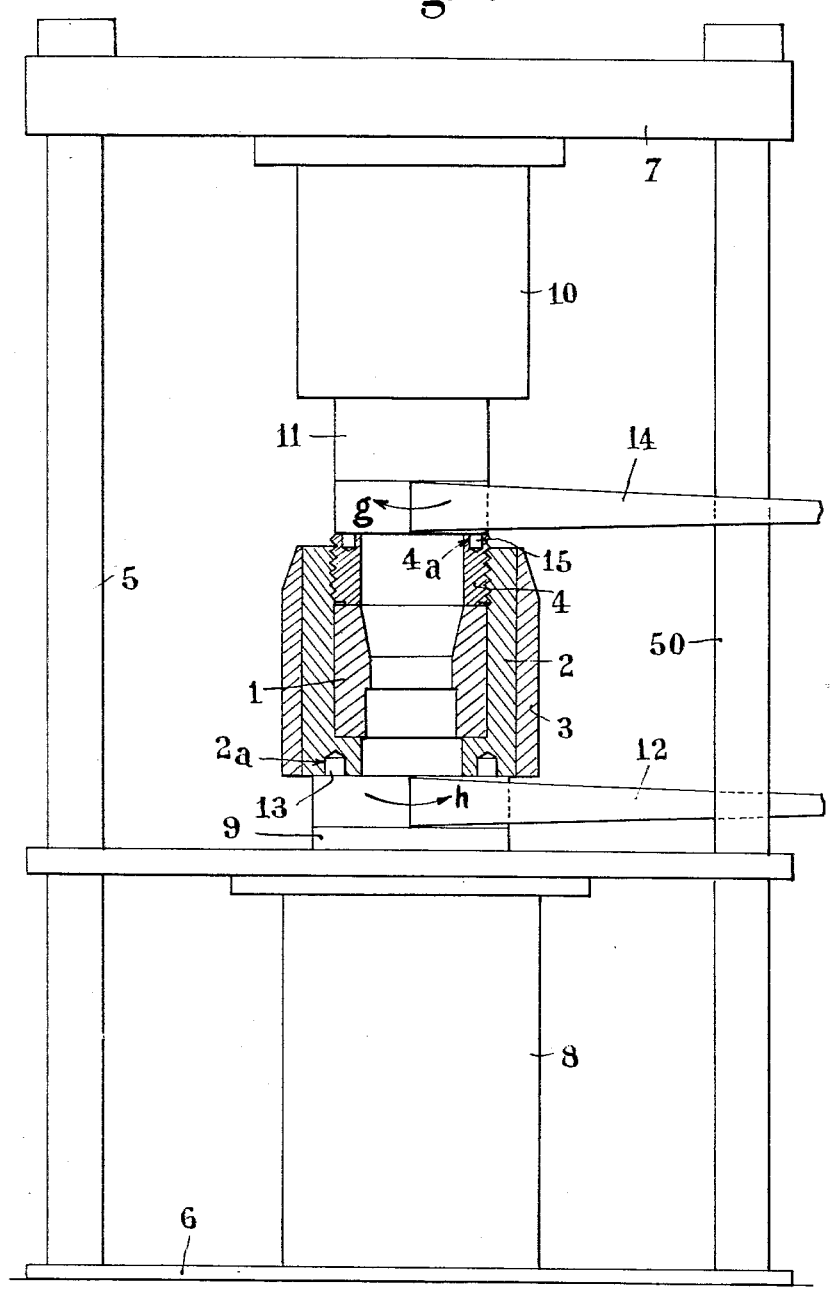

United States Patent Office 3,248,972
Patented May 3, 1966

3,248,972
METHOD OF MAKING A COLD DRAWING DIE
René Beghi, Bois Colombes, France, assignor of one-half to Societe d'Etudes et d'Equipements d'Entreprises, Paris (Seine), France
Filed June 10, 1965, Ser. No. 462,994
Claims priority, application France, Apr. 18, 1962, 894,899, Patent 1,328,457
2 Claims. (Cl. 76—107)

The present application is a continuation-in-part of the U.S. patent application Ser. No. 273,479 filed on April 16, 1963, now abandoned.

In cold-drawing operations compound bolsters are used wherein the die is enclosed in one or more protective members. To withstand the considerable radial stress applied to the die during the drawing operation one of these protective members is a ferrule force-fitted on the outer periphery of the die so as to provide in this die, in the inoperative condition thereof, a radial compressive prestress relieving the radial expansion stress to which this die is subjected during the passage of the bar to be drawn. By properly dimensioning these ferrules it is possible to avoid breakages in a diametral plane. However, experience teaches that in this case breakages in a radial plane are a frequent occurrence, these failures being ascribable of course to an abnormal strain produced in the metal in the direction of the longitudinal stress or tension. Thus, to relieve this strain, manufacturers were led to complete the radial compressive prestress with a longitudinal compressive prestress. Various compound bolsters of this character have already been proposed wherein the die is subjected to stresses applied in both directions. However, in these known constructions these stresses are not clearly defined and moreover the methods applied to this end are generally not sufficient to develop the requisite high-value prestresses notably in the specific case of the manufacture of a bolster for drawing large-diameter steel bars.

It is a first object of this invention to provide a compound bolster for cold-drawing steel bars, wherein the die is subjected to a prestress consisting of the superposition of two uniform compressive prestresses of which one is purely radial and the other purely longitudinal.

It is another object of this invention to provide a method of manufacturing a compound bolster wherein the die is subjected to a radial compression and to a longitudinal compression having the desired value.

It is a complementary object of the present invention to provide a method of manufacturing a compound bolster by applying to the die a radial compression and a longitudinal compression having a value as high as desired and necessary for manufacturing a die designed for cold drawing steel bars of relatively large diameter.

The manufacturing method broadly set forth hereinabove will now be described in detail hereinafter with reference to the accompanying drawing in which:

FIGURE 2 is a side elevational view showing diagrammatically a press suitable for constructing the bolster of FIGURE 1, shown in axial section on a reduced scale.

Figure 1:
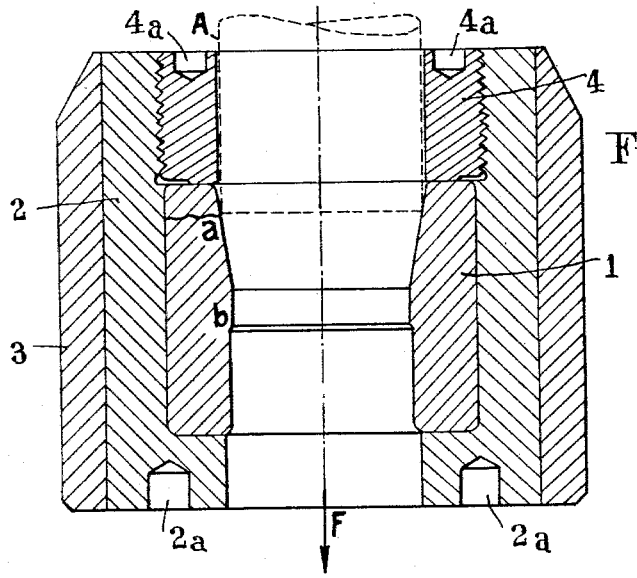
FIGURE 1 is an axial longitudinal section showing a compound bolster constructed according to the teachings of this invention.
Figure 3:
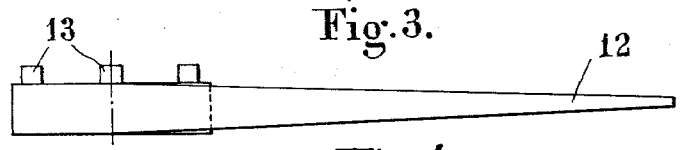
FIGURES 3 and 4 are an elevational view corresponding to FIGURE 2 and a plan view from above showing a removable tool of the press.
Figure 4:
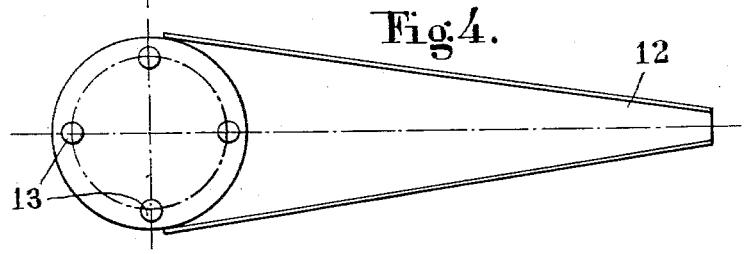
Figure 5:
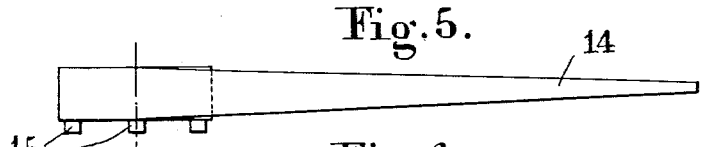
FIGURES 5 and 6 are similar views of another removable tool of the press.
Figure 6:
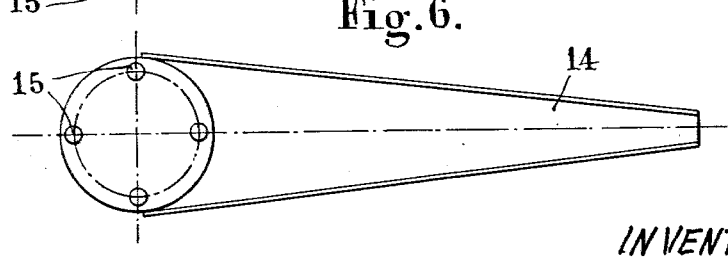

The compound bolster comprises a die 1, a casing 2, a ferrule 3 and a screw-threaded ring nut 4; the casing 2 has a cylinder external wall and an inner wall comprising a smooth cylindrical intermediate portion having a diameter slightly less than the outer diameter of the die, an upper screw-threaded portion of a diameter somewhat larger than that of said cylindrical intermediate portion, and a shouldered lower portion. In the lower face of this shoulder blind holes 2a are formed. The ferrule 3 has a cylindrical inner surface of a diameter slightly less than the outer diameter of casing 2. The ring nut 4 has screw-threaded outer surface of a pitch corresponding to the inner threads of the upper portion of the inner wall of casing 2.

The mounting of the four component elements described hereinabove in their condition prior to this assembly is performed as follows:

The die 1 is force-fitted into the casing 2 until the die engages the upper face of the shoulder formed in this casing. During this assembly step the die 1 is subjected, by the reaction of the expanded casing, to a radial compressive prestress of which the value may be determined as desired by properly selecting the dimensions and grade of the metal constituting the die and casing. The resulting assembly comprising the die 1 and casing 2 is then force-fitted into the ferrule 3 until the lateral walls of the casing are completely covered by this ferrule. A further radial compressive prestress is thus added to the first one throughout the mass of the die 1. The dimensions and grade of the metal constituting the first three component elements thus assembled are selected with a view to give to this global radial prestress of the die the value necessary to avoid, during the drawing operation, a failure of the die 1 substantially in a radial plane. In all cases this prestress will exceed the elastic limit of this die 1.

The die obtained according to the above-described first steps of the manufacturing process according to this invention, which are already known per se, cannot give satisfactory results. In the drawing (FIGURE 1) the dash line A shows the section of the bar to be drawn which is engaged through the die as a consequence of a tractive effort exerted in the direction of the arrow F, before this section actually contacts the working surface ab of die 1. Experience teaches that in many cases a die of this type will break frequently along a transverse plane substantially level with the circle of the inner surface of the die which intersects the limit point a of the contour shown in FIGURE 1. In order to avoid this failure the method of this invention comprises the application of a longitudinal compressive prestress of a value sufficient to preserve the longitudinal cohesion of the metal constituting the die 1 during the cold-drawing operation. This result is obtained by resorting to the two following steps of the method of this invention. Firstly, the screw-threaded ring nut 4 is screwed in the inner screw-threads of the upper portion of casing 2 until the inner face of this ring nut 4 engages the upper face of die 1. Then a strong axial pressure is exerted on the upper face of the screw-threaded ring nut 4, this pressure being thus transmitted to the die 1 and compressing same against the upper face of the shoulder formed on casing 2, in conjunction with a torque just sufficient to screw the ring nut 4 in as the compression and therefore the slight reduction in height of die 1 take place. Of course, when the application of said pressure and said torque to ring nut 4 is discontinued, the die preserves its longitudinal prestress.

The method of this invention is applicable by using any equipment, preferably of hydraulic type, suitably constructed to permit the application of relatively high-pressure values through a control member capable of pivoting when a moderate stress is applied thereto. This control member may consist for example of the piston of a hydraulic cylinder.

FIGURE 2 illustrates a typical example of a hydraulic press suitable for this application.

The frame structure of the press comprises a base 6, two vertical uprights 5, 50 and an upper cross member 7. Mounted on said base 6 between the two uprights 5 and 50 is the body 8 of a hydraulic cylinder having its piston 9 emerging from the top thereof, as shown. Secured under the upper cross member 7 is the body 10 of another hydraulic cylinder having its piston 11 disposed coaxially to the first piston 9. Against the faces of the respective pistons are placed two levers 12 and 14 each having circular levers 12, 14 having each a circular plate at one end and a handle at the opposite end; each circular plate comprises a smooth outer face and an inner face carrying a circular row of pins 13, 15 so dimensioned and disposed as to engage blind holes respectively 2a of casing 2 and 4a of ring nut 4. The above-described means for the prestressed assembling of die 1, casing 2, ferrule 3 and ring nut 4 are operated as follows:

The casing 2 is laid upon piston 9 and die 1 is engaged into the upper portion of this casing. The piston 11 is moved downwards to begin the forced sinking of die 1 into casing 2. This movement is continued while interposing a punch between the upper piston 11 and the die 1, until the die 1 abuts against the inner shoulder of casing 2. The resulting casing and die assembly is removed from the press and the ferrule 3 is positioned on a plate laid on the top of the piston 9 of the lower cylinder. The casing and die assembly is inserted into the upper aperture of ferrule 3 and the piston 11 of the upper cylinder is moved downwards to complete the forced sinking of the casing and die assembly into the ferrule 3. The resulting casing-die-and-ferrule assembly is then removed from the press. The lower smooth face of the circular plate of lever 12 is laid upon the upper face of piston 9, and the aforesaid assembly 1, 2, 3 is placed upon this circular plate so that the pins 13 engage the blind holes 2a of casing 2. Then the screw-threaded ring nut 4 is engaged into the upper aperture of casing 2 and screwed by rotating the lever 14 until the lower face of this ring nut 4 engages the upper face of die 1. Then the piston 11 is gradually lowered, or piston 9 gradually raised, or both pistons are moved simultaneously toward each other by exerting simultaneously a light effort in the screwing direction on both levers 12 and 14. In the construction illustrated by way of example in the drawings both levers 12, 14 have a length greater than one-half of the relative spacing of uprights 5 and 50, and are disposed on either side of the vertical planes containing these vertical uprights. From the position illustrated in FIGURE 2 a 180-degree screwing movement may be performed by rotating the lever 14 in the direction of the arrow $g$ (in the clockwise direction, assuming that right-hand threads are used) from its position of engagement with the upright 50 to its position of engagement with the other upright 5 while maintaining the other lever 12 in engagement with the upright 50. Then another half-turn screwing may be performed by moving the lever 12 in the direction of the arrow $h$. To obtain an additional revolution, if necessary, both pistons 9 and 10 are released from the die assembly 1 to 4 being manufactured, and also from the pair of levers 12 and 14, and this assembly is disposed again between the two pistons by moving the levers 12, 14 to their initial positions shown in the figure. During the compression operation the casing 2 is rotatably fastened by means of the pins 13 to the plate of lever 12 which is rotatably solid in turn, by virtue of the cylinder pressure and also of the high frictional torque resulting therefrom, with the upper face of piston 9. Similarly, the screw-threaded ring nut 4 is rotatably solid with the lower face of upper piston 11 due to the pins 15 engaging the blind holes of the plate of lever 14, this lever being rotatably solid in turn with this piston face due to the cylinder pressure and the high frictional torque resulting therefrom. The actuation of one of these levers 12 or 14 is not counteracted by any resistance outside the rotational resistance of pistons 9 or 11, that is, the frictional resistance resulting from the packing of this piston and the screwing resistance of the screw-threaded ring nut 4 which is of the same order as any conventional screwing resistance. Therefore, the manual operation of the two levers 12 and 14 is not attended by any difficulty for the operator.

Considering the manufacture of a die for cold drawing steel bars of relatively large diameter, a very high compressive force is required; to be efficient this force should be of the order of magnitude of the tractive effort exerted on the bar during the drawing operation proper, which corresponds in the mass of the die to a longitudinal compressive prestress of the order of 70,000 p.s.i.

What I claim is:

1. A method of manufacturing a compound bolster for cold drawing steel bars, notably of relatively large diameter, comprising providing a die having a cylindrical outer surface, a casing formed with a cylindrical outer wall and an inner wall comprising a smooth cylindrical intermediate portion of a diameter slightly less than the outer diameter of said die, a shoulder-forming lower portion and a screw-threaded upper portion of a diameter greater than that of said cylindrical intermediate portion, a ferrule having a cylindrical inner surface of a diameter slightly less than the outer diameter of said casing, and a ring nut having screw threads of the same pitch as the inner threads of the upper portion of the inner wall of said casing; force-fitting said die into said casing until said die engages the shoulder of the lower portion of the inner wall of said casing; force-fitting the resulting die and casing assembly into said ferrule; screwing said ring nut into the screw-threads of the upper portion of the inner wall of the casing until said ring nut engages said die; exerting on said ring nut a compressive force and a torque and removing said force and torque, whereby the lateral and longitudinal prestresses are maintained in said die.

2. A method of manufacturing a compound bolster for cold drawing steel bars, notably of relatively large diameter, comprising providing a die, a casing having an inner diameter slightly less than the outer diameter of the die, a ferrule having an inner diameter slightly less than the outer diameter of the casing, and a screw-threaded ring nut; force fitting the die into the casing; force fitting the die and casing assembly into the ferrule; screwing in the casing on the die the screw threaded ring nut; applying a gradually increasing axial pressure on said ring nut and screwing simultaneously said ring nut in said casing, and releasing said axial pressure when the longitudinal compression of the die attains a rate greater than its elastic limit.

No references cited.

GRANVILLE Y. CUSTER., JR., *Primary Examiner.*